(No Model.)
W. A. BARRINGTON.
COFFEE POT.
No. 519,657. Patented May 8, 1894.
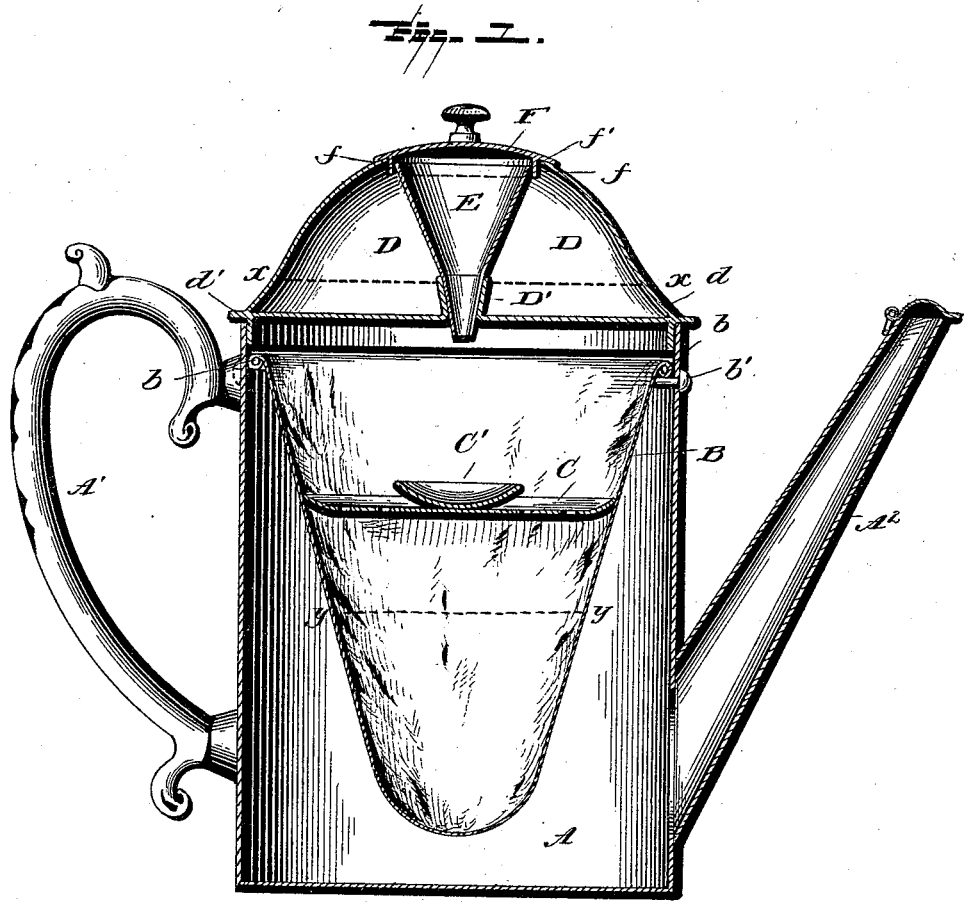
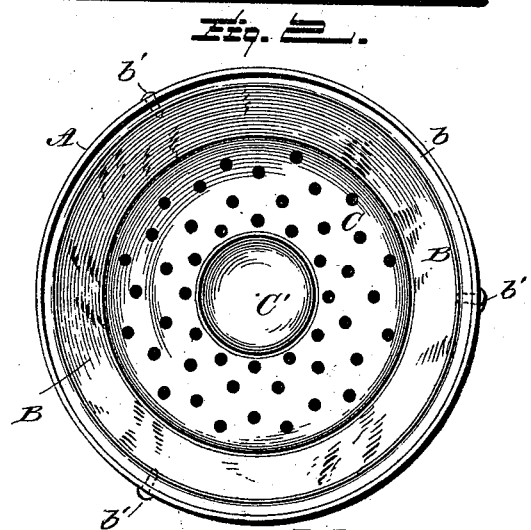
Witnesses:
L. C. Hill
E. H. Bond
Inventor:
William A. Barrington
By E. B. Stocking
Attorney

UNITED STATES PATENT OFFICE.

WILLIAM A. BARRINGTON, OF LOUISVILLE, KENTUCKY.

COFFEE-POT.

SPECIFICATION forming part of Letters Patent No. 519,657, dated May 8, 1894.

Application filed June 8, 1893. Serial No. 476,909. (No model.)

*To all whom it may concern:*

Be it known that I, WILLIAM A. BARRINGTON, a citizen of the United States, residing at Louisville, in the county of Jefferson, State of Kentucky, have invented certain new and useful Improvements in Coffee-Pots, of which the following is a specification, reference being had therein to the accompanying drawings.

This invention relates to certain new and useful improvements in coffee pots in which is provided a sack or analogous device for holding the coffee, and a condensing chamber above the same, and it has for its objects among others to provide a coffee pot which shall be simple in its construction and hence easily and cheaply manufactured, and by the use of which the strength of the coffee will be evenly extracted and the beverage will retain all the fine flavor and aromatic oil of the coffee making the same bright and clear as wine and giving to it a better flavor than heretofore.

I suspend within the pot proper a sack in which the ground coffee is designed to be held and in this sack above the coffee I provide a perforated spreader which has a saucer-shaped central portion which serves both as a handle by which the spreader may be taken out or placed in position and as a collector of the water from the funnel above and from which saucer the water is spread evenly over the perforated spreader. Above the sack and spreader is a condensing chamber designed to contain cold water and which completely covers the top of the pot proper so as to condense every particle of the steam or vapor which arises from the coffee when the boiling water is poured upon the coffee through a funnel which passes through an opening in the center of the bottom of the condensing chamber. This condensing chamber may assume any desired shape, preferably dome-shaped as shown, and the funnel, which is made removable, is supported centrally therein and extends nearly if not quite to the top thereof, in all cases above the water line thereof, the condensing chamber having an opening in its top which is closed by a cap which has a flange which embraces the upper end of the funnel and keeps the latter steady. The funnel need not, however, extend upward sufficiently to be embraced by the flange of this cap.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1 is a substantially central vertical section through a coffee pot embodying my invention. Fig. 2 is a plan with the condensing chamber removed and the handle and spout omitted.

Like letters of reference indicate like parts in both of the views.

Referring now to the details of the drawings by letter, A designates a coffee pot provided with a handle A' and a spout A² of any approved construction.

B is a sack or holder for the coffee; it is designed to be detachably supported within the pot in any suitable manner, as, for instance, by having its mouth provided with a wire $b$ which serves to keep the same distended and this wire resting upon the inwardly-extending projections $b'$ which may be pins passed through the wall of the pot and soldered to prevent escape of steam.

C is a perforated, preferably metal, spreader, designed to fit within the sack B and to be there held by engagement therewith at a point above the top (see line $y$—$y$) of the ground coffee as shown in Fig. 1 and upon the upper face of this spreader preferably centrally thereof as shown, is a saucer-shaped part C' which serves as a handle by which the spreader may be manipulated and it has a further function of catching the water as it falls through the funnel above and from thence it overflows upon the spreader as indicated by the arrows in Fig. 1.

D is the condensing chamber; it has a downwardly-extending flange $d$ which is designed to fit quite snugly within the upper end of the pot as shown in Fig. 1 and it has also a horizontal flange $d'$ which rests upon the upper edge of the body of the pot. The bottom of the chamber has a central opening surrounded by a tapered neck or boss D' into which is fitted the tapered end of the funnel E which extends up within the chamber any desired distance but always above the water line $x$—$x$ of the chamber and preferably to nearly the top of the chamber as shown in Fig. 1, so as to be embraced by the depending flange $f$ of the cap or cover F which closes an opening $f'$ in the top of the condensing chamber as shown. The condensing chamber may assume any desired shape but it should extend over the entire surface of the top of the pot so as to readily condense every particle of steam or vapor which may arise.

With the parts constructed and arranged substantially as above set forth the operation is as follows:—The ground coffee is placed in the sack B and the latter is supported within the pot as shown. The condensing chamber is placed in position and cold water placed therein, say to the line $x$—$x$, and, the spreader with its saucer-shaped receptacle having been placed in the sack above the coffee, the funnel is inserted in its position and boiling water poured thereinto, from which it falls onto the receptacle C' from which it overflows onto the spreader and from thence through the perforations is evenly distributed on the ground coffee in the sack. When the boiling water has been introduced the cap or cover F should be placed in position so as to prevent escape of any steam or vapor, which, arising, is rapidly condensed upon the under side of the condensing chamber and falls back into the sack and upon the coffee.

What I claim as new is—

1. A perforated spreader for a coffee pot, substantially dish-shaped and provided upon its upper face with a receptacle serving also as a handle, as set forth.

2. A condenser for a coffee pot formed with a downwardly extending flange, a horizontal flange and having central openings in its bottom and top and a movable cover for the upper opening with a depending flange, substantially as specified.

In testimony whereof I affix my signature in presence of two witnesses.

WILLIAM A. BARRINGTON.

Witnesses:
HEATH SUTHERLAND,
L. C. HILLS.